(12) United States Patent
Bergert

(10) Patent No.: US 7,636,669 B1
(45) Date of Patent: Dec. 22, 2009

(54) RECREATIONAL OUTING RESERVATION SYSTEM

(76) Inventor: Thomas F. Bergert, 4611 Kirkland Pl., Alexandria, VA (US) 22311

( * ) Notice: Subject to any disclaimer, the term of this patent is extended or adjusted under 35 U.S.C. 154(b) by 1675 days.

(21) Appl. No.: 09/473,136

(22) Filed: Dec. 28, 1999

Related U.S. Application Data

(60) Provisional application No. 60/114,113, filed on Dec. 29, 1998.

(51) Int. Cl.
*G06Q 10/00* (2006.01)

(52) U.S. Cl. .......................................................... 705/5

(58) Field of Classification Search ...................... 705/5, 705/6, 8
See application file for complete search history.

(56) References Cited

U.S. PATENT DOCUMENTS

| | | | | |
|---|---|---|---|---|
| 5,127,044 | A * | 6/1992 | Bonito et al. | 379/88.16 |
| 5,596,636 | A * | 1/1997 | Davies et al. | 379/216.01 |
| 5,940,803 | A * | 8/1999 | Kanemitsu | 705/6 |
| 5,963,913 | A * | 10/1999 | Henneuse et al. | 705/9 |
| 6,016,478 | A * | 1/2000 | Zhang et al. | 705/9 |
| 6,272,467 | B1 * | 8/2001 | Durand et al. | 705/1 |

FOREIGN PATENT DOCUMENTS

| | | | |
|---|---|---|---|
| JP | 04335461 | A * | 11/1992 |
| WO | WO 00/63808 | * | 10/2000 |

OTHER PUBLICATIONS

Diaz, Christina Valdez, "Road Warriors plot their course early", USA Today, Sep. 23, 1997, p. E, 4:1.*
Pastin, Bob, "World Amateur Handicap Tourney is Mecca for Hackers", St Louis post-Dispatch, Jul. 4, 1993, p. 11F.*
Kasavana, Michael L., "Making more hours in the day", Club Management, Oct. 1993, vol. 72, No. 5, p. 79.*
Caruthers et al., "Golfers can use Web to set tee times", Daily Herald, Jul. 23, 1998, p. 1.*
Information found on the web site of GolfAgent, Mar. 31, 1997, 3 pages.*
Information found at the web site of Temaster, Inc., Dec. 1998, 2 pages.*
Romenesko, James, "Saint Paul Pioneer Press, Minn., Hot List Column", Saint Paul Pioneer press, Mar. 16, 1998, 2 pages.*

* cited by examiner

*Primary Examiner*—Robert W Morgan

(57) ABSTRACT

A reservation system for arranging recreational outings such as golf outings provides for the simple arrangement of recreational outings with common playing partners as well as those having similar business, social, or other interests. The system is operable on a network such as the World Wide Web of the Internet and allows the user to check all linked facilities for available reservation times and notify potential playing partners. In one embodiment, the user can notify his or her potential playing partners before actually booking the reservation with the provider. In another embodiment of the invention, the notified parties may confirm their acceptance into the reservation.

21 Claims, 5 Drawing Sheets

Fig. 3

| Common playing partners |
|---|
| Age range 65 + |
| Age range 56-65 |
| Age range 46-55 |
| Age range 36-45 |
| Age range 26-35 |
| Age range below 26 |
| handicap 0-8 |
| Handicap 9-16 |
| Handicap 17 + |
| Hunters |
| Fishers |
| Skiiers |
| Doctors |
| Lawyers |
| Accountants |
| Computer Services |
| Engineers |
| Telecommunications |
| Auto repair |
| Will joins |

65

RECREATIONAL OUTING RESERVATION SYSTEM

REFERENCE TO RELATED APPLICATIONS

This application claims the benefit of U.S. Provisional Application Ser. No. 60/114,113, filed Dec. 29, 1998.

FIELD OF THE INVENTION

The present invention relates to reservation systems, and more particularly to an on-line reservation system for arranging recreational outings such as golf outings.

BACKGROUND OF THE INVENTION

In arranging recreational outings which typically require advance reservations, such as golf, tennis, and indoor racquet sports, for example, much time can be spent discovering available times in which various candidate facilities will allow one or one's group to play. As an example, if an individual or group desires to play a round of golf, depending on the location, a reserved tee time is usually strongly encouraged. By calling around to various local public or semi-private golf courses, one can obtain information as to which courses have available tee times given the desired date, time, and number of golfers in the party. Upon discovering a desirable tee time, the individual making the reservation must then inform other playing partners of the time, date, and location of the facility in which the reservation is held in order to fill the required number of players for the reservation. This can prove to be a time-consuming and sometimes ineffective activity. Additionally, the time spent by golf course personnel servicing customer calls can often be stressful and inefficient, due to having to provide repetitious information about course conditions, lack of available tee times, and driving directions, for example. Thus, the overall process of arranging a recreational outing such as a round of golf can be time consuming and frustrating for many involved.

While systems have been developed which collect data from regional courses and allow users to make a reservation at certain courses via telephone or via the Internet, none of these systems allows the user to easily notify his or her common playing partners of the reserved tee time and other pertinent information of the reservation. Also, none of the known systems allow a user to notify potential business or social acquaintances of the reservation. Further, none of these systems allow the notified parties to link back into the reservation to confirm their participation. Also, no system allows a user to access hourly-adjusted pricing scales.

SUMMARY OF THE PRESENT INVENTION

By the present invention, there is provided a reservation system for arranging recreational outings such as golf outings wherein the user encounters greater speed, convenience, and ease of use than on any previously existing system. Further, the system allows for the simple arrangement of recreational outings with those having similar business, social, or other interests. The system is operable on a network such as the World Wide Web of the Internet and allows the user to make, change, or cancel a reservation in real time. The system allows the user to check all member facilities for available reservation times and can reduce the field of available options according to the user's personal preferences. Once the user has selected a reservation option, the system allows the user to notify one or more individuals with whom the user desires to participate in the outing. These other individuals include those who have consented to be notified, such as common playing partners, those with similar business or social interests, and those at a similar level of play, for example. In one embodiment, the user can notify his or her potential playing partners before actually booking the reservation with the provider.

BRIEF DESCRIPTION OF THE DRAWINGS

FIG. 3 is a diagram showing one embodiment of a list of profile elements for a participant's individual system profile.

DETAILED DESCRIPTION OF THE PREFERRED EMBODIMENTS

As shown in FIGS. 1 through 5, by the present invention there is provided a multiple server 10 environment which comprises a computer system in accordance with the present invention that allows multiple users to communicate with one another via the system and client systems 20, 22.

Figure 1:
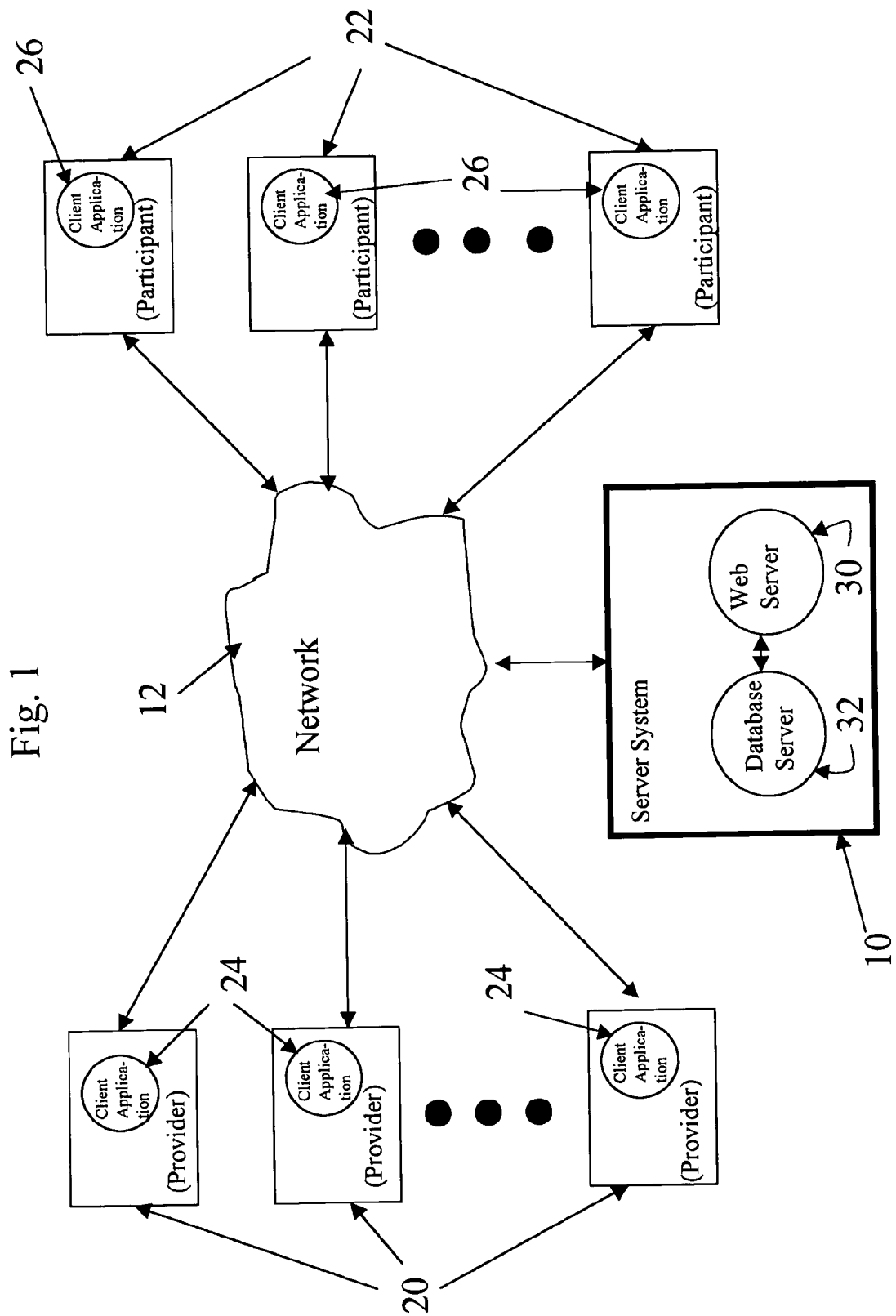
FIG. 1 shows a system-level block diagram of one embodiment of a computer system in which the present invention may be used.

FIG. 1 is a block diagram of one embodiment of a network, indicated generally at 12, interconnecting a server system 10 and a plurality of client systems 20, 22. In the embodiment of FIG. 1, client systems 20 are connected to the network 12 and execute client applications 24. Client systems 20 are associated with recreational facility providers having available reservations which they seek to fill. Additional client systems 22 are connected to the network 12 and execute additional client applications 26. Each client system 22 is associated with users desiring to seek and book a reservation or participate in an activity at a recreational facility which is part of the network. Client systems can be any device that connects to the system via the Internet or other Internet Protocol (IP) transport methods and includes, but is not limited to, such devices as televisions, computers, hand-held electronic devices, wireless electronic devices, and any other device that uses IPs and a transport medium.

A server system 10 is connected to the network 12 and executes one or more server applications 30, 32. Network 12 can be a local area network or LAN, a wide area network or WAN, the Internet, an Intranet, or other appropriate network for interconnecting and supporting communication between client systems 20, client systems 22 and server system 10. Other non-limiting examples of the network include a satellite link, cable, twisted pair, ATM link, FDDI link, fiber-optic, and broadcast wireless network, for example. Client applications 24 and client applications 26 can communicate across network 12 in conformance with a uniform network protocol, such as hyper text transfer protocol, or "http", to access network resources on server system 10 or on other network server systems. In alternative cases, clients will communicate with the system using protocols appropriate for the network to which that client is attached. In one embodiment of the invention, client applications 24, 26 are web browsers and the server system includes a Web server 30 and a Database server 32. In this embodiment, server applications 30, 32 facilitate the arranging of a recreational outing, such as a golf outing, for example, by providing web pages and database information to client systems 20, 22 and processing information submitted from those web pages. Additionally, the functions performed by the server applications 30, 32 can involve one or more server processes and can use network technologies such as Java script and applets, or CGI scripts.

The server system 10 includes a Web server application 30 and a Database server application 32. Web server 30 sends client interface information as hypertext markup language, or HTML, through the network to the client applications. In one embodiment of the invention, the client applications include a Web browser software program and an electronic mail reader that execute within a client system 20.

The Web server 30 is responsible for all interactions with the Web browser in client systems, and serves as the client interface to the system. All interactions between client systems and the Database server 32 occur through the Web server 30. Internet information Server (IIS) by Microsoft Corporations is preferably used as the Web server 30 software. In one embodiment of the invention, the Web server's operating system is based on Windows NT 4.0 Server. Windows NT is a multi-platform operating system provided by Microsoft Corporation of Redmond, Wash. The current implementation of the present system, including servers 30, 32 and clients 20, 22, can operate on a variety of microprocessors, such as the Pentium Pro microprocessor based computers manufactured by Intel Corporation.

The Database server application 32 houses a database of information, including reservation information at given recreational facilities. In one embodiment of the invention, the database server runs Microsoft's SQL server version 7.0 database management software. The Database server 32 operates in concert with the Web server 30 and maintains information including all the participant profile information, the recreational facility provider reservation information and other information. The reservation information includes at least one selection option comprising at least a time and a date of an available reservation slot for an activity from one of the recreational facilities. Further information about the recreational facility can include information such as name, address, location, greens fees, course rules and requirements, slope, rating, and directions to the facility, for example. In one embodiment of the invention, the reservation information is submitted to Web server application 30 by a recreational facility provider using a client application 24. The database of information also includes information related to the participants of the system. For example, each participant can have profile information comprising elements related to their individual backgrounds and interests, such as occupation, income level, age range, gender, skill level related to particular recreational activities (e.g., golf handicap), hobbies, and interests, for example.

Figure 2:
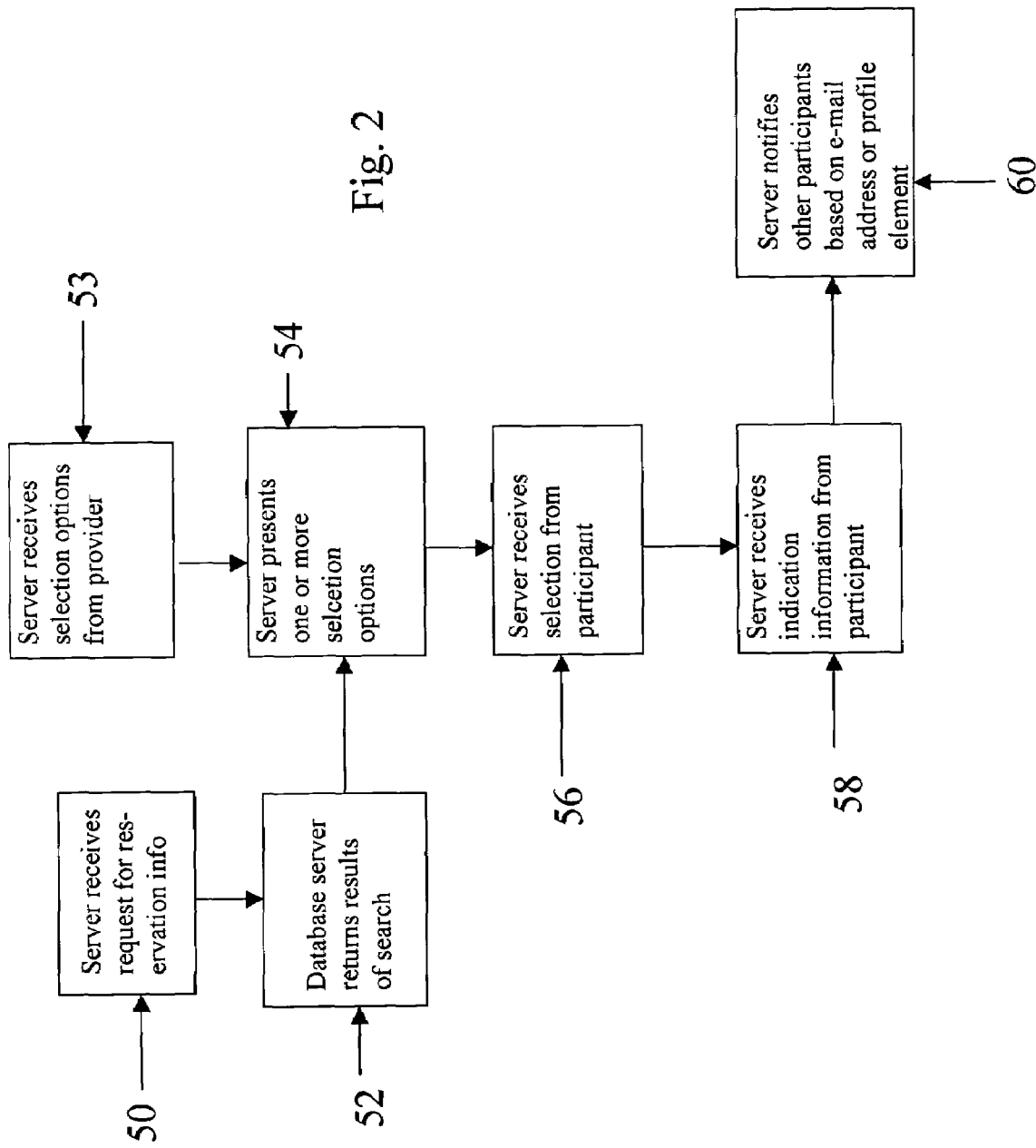
FIG. 2 is a flow chart of one embodiment of a method of arranging a recreational outing in accordance with the present invention.

FIG. 2 shows a flow chart of one embodiment of a method, implemented using Web server 30, for arranging a recreational outing at a recreational facility requiring reservations. In step 54, the Web server 30 has accessed the Database server to ascertain one or more selection options from the connected recreational facility providers. In one embodiment, as indicated by step 50, the Web server 30 may receive a request from a participant using a client application to perform a search, indicated by step 52, of the database to ascertain available reservations. In another embodiment of the invention, as indicated by step 53, the Web server application will transmit a list of the available reservations to the participant using a client application.

In step 56, the Web server receives a selection from a first participant using a client application 26 of the available selection options in the database. In step 58, the Web server receives indication information from the first participant using a client application 26. The indication information includes information necessary for the Web server to deliver a notification to other participants of the reservation selection, performed in step 60. In one embodiment of the invention, the indication information is a list of electronic mail addresses of those participants which the first participant desires to join in the recreational activity. The first participant may pre-populate such a list within their user profile in the database, so that when arranging future activities, this list is quickly available. In another embodiment of the invention, the indication information is related to one or more elements of the participant's personal profile, whereby the server application can send the selection information to those participants falling within the class of participants having the selected element or elements. FIG. 3 illustrates an example list 65 of elements within a participant's profile information which may be selected in order to notify additional participants. As an example, the first participant may wish to join in the activity with any players having a handicap of eight or less. Upon communicating this desire through the network to the Web server, a search of the Database server will be conducted to return the electronic mail addresses of those other participants who have submitted into their database profile a handicap of eight or less. The Web server will then send the information related to the reservation selection to those additional participants. It will be appreciated that other forms of notification beyond electronic mail may fall within the purview of the present invention, such as notification through fax number, wireless Internet devices or paging devices.

Figure 4:
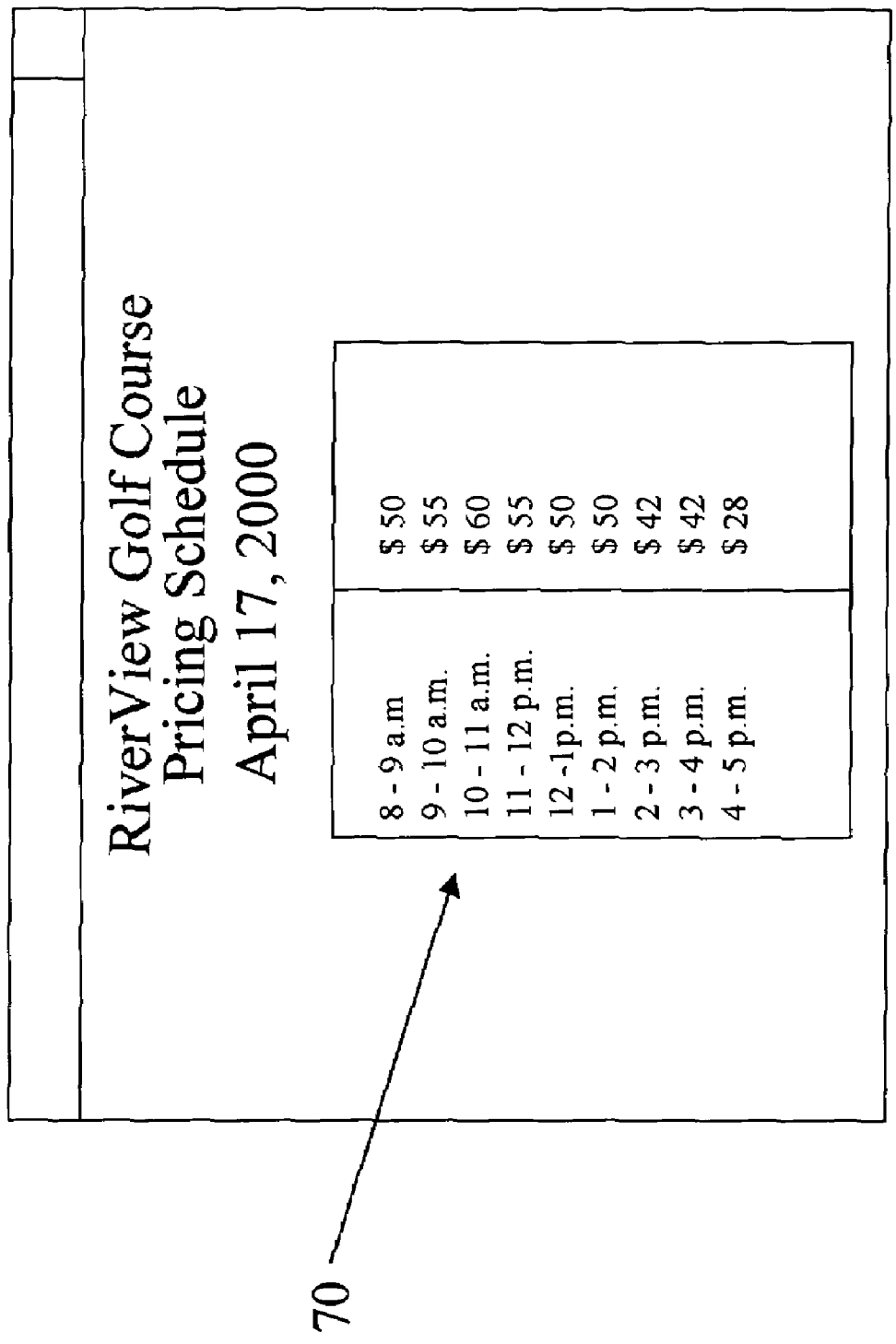
FIG. 4 is a diagram showing one embodiment of a pricing schedule for a given recreational facility provider.

The selection by the first participant of a selection option can be based upon several criteria. For example, the selection can be based upon time and date of the reservation option, facility location, and cost of the activity, for example. In one embodiment of the invention, the cost of the activity can vary depending upon the time of the reservation option. The cost of the activity may be submitted by a provider recreational facility using a client application 24. In a specific embodiment of the invention, as illustrated in FIG. 4, the cost information can vary depending upon the hour of the reservation. This allows the facility providers to dynamically price the activity depending upon the popularity of a given time and date.

When the Web server application 22 notifies the additional participants based upon the indication information, the Web server may include such information as the time and date of the reservation selection, the location of the facility selected, driving directions to the selected facility, the identity of the first participant making the selection, and a price for the selected facility based upon the given time and date of the selection. This information is obtained through the Database server.

The first participant may book or reserve the selected reservation either before or after notifying his or her potential playing partners. If the first participant reserves the selection before notifying his or her partners, the reservation selection is no longer available to another participant accessing the database of information. However, the first participant runs the risk that no additional participants will be able to join in the reservation and the first participant may have to cancel the reservation. Alternatively, if the first participant books the selection after notifying his or her partners and waiting for replies from the partners, the selection may be accessed and reserved by another participant before being booked by the first participant. In one embodiment of the invention, the first participant can notify other participants of several reservation options and receive indications from those participants as to which option they prefer before the first participant books the reservation.

Figure 5:
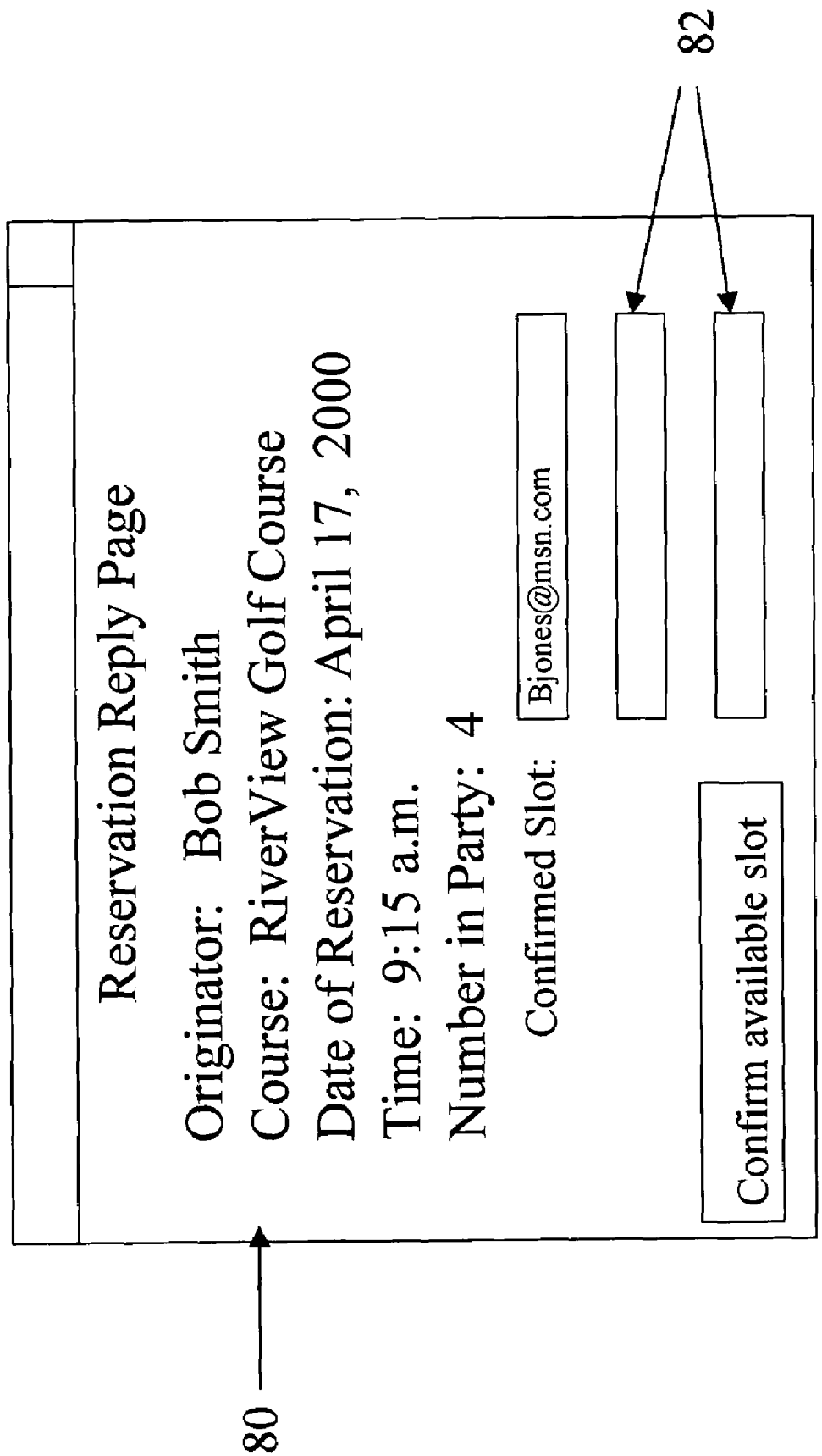
FIG. 5 is a diagram showing one embodiment of a reservation reply page in accordance with the present invention.

In one embodiment of the invention, as shown in FIG. 5, the server application may create a reservation reply page 80 having available slots 82 which can be filled by the notified participants using client applications. In this embodiment, the server application may include in the electronic mail notification a link to the reservation reply page. The reservation reply page can be a web page on the Internet, for example. In one embodiment of the invention, the recreational activity is golf and the number of available slots on the reservation reply page is limited by the number of golfers in the reservation. As an example, if the first participant chooses to book a group of four golfers for the reservation, the reservation reply page would have three available slots to be filled once the additional participants had been notified by the server application. In such an instance, the first participant would be capable of setting the rules by which the group of four would be filled. For example, the first participant may elect for the group to be filled based upon the first to reply with a confirmation to the reply page. In one embodiment, participants may confirm their position within a reservation using an identifier from the server notification communication, such as their name, e-mail address, reservation number or other identifier. Alternatively, the first participant may elect for the group to be filled based upon his or her own selection once every confirmation reply has been received.

Thus, it can be seen that the system and method of the present invention allows a participant to complete the entire process of arranging a recreational outing for a group of participants, from securing the reservation, to notifying other participants, to confirming their acceptance in the activity. By having this performed under a single system, the user can save a tremendous amount of time while storing profile information which can reduce the hassle of the arrangement process and increase the enjoyment of the activity.

The system of the present invention may be used by participants in other recreational activities which require reservations, such as tennis for singles or doubles, and indoor racquet sports such as racquetball, squash, or handball, for example. The system of the present invention may also be used by those desiring to arrange an outing to see a music concert, movie, or sporting event by allowing one individual to acquire tickets for the event and notify other selected individuals.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of arranging a recreational outing for participants using a computer, comprising the steps of:
   a) providing a database of information including reservation information, said reservation information including at least one selection option, said option including a time and a date for an activity from a plurality of recreational facilities, said database further including profile information for a plurality of said participants, said profile information for each of said plurality of participants including at least one element;
   b) receiving a non-facility specific request pertaining to a plurality of facilities for at least one selection option;
   c) retrieving and transmit, based on said received request, at least one selection option pertaining to at least one available reservation;
   d) receiving a selection from a first one of said participants of a selection option;
   e) receiving indication information including a selection from said first participant of at least one element corresponding to an element of said profile information of at least one additional participant;
   f) determining a subset of said participants from said database of participants having said profile element;
   g) communicating said selection to said subset of participants;
   h) receiving acceptance information from at least one other participant using a client computer and
   i) after receiving said acceptance information in step h), receiving instructions from said first participant using a client computer to book a reservation for the time and date and facility connected with said selection option.

2. The method of claim 1 wherein said element is an element taken from the group of elements consisting of: a hobby, an occupation, an age range, a gender, an income level.

3. The method of claim 1 wherein said indication information includes an electronic mail address of at least one other participant.

4. The method of claim 1 wherein said step of communicating said selection includes providing information as to the time, date, and facility location of said selection.

5. The method of claim 1 wherein said step of communicating said selection includes providing information as to the identity of said first participant.

6. The method of claim 1 wherein said step of communicating said selection includes providing information as to the directions to the physical location of said recreational facility.

7. The method of claim 1 wherein said database of reservation information is received from said at least one recreational facility using a client application and includes a pricing schedule.

8. The method of claim 7 wherein said pricing schedule includes prices which vary depending upon the hour of the reservation selection, and wherein said step of communicating said selecting includes providing information as to the time and price of said selection, said price being determined by the associated time of the selection.

9. The method of claim 1 wherein said activity is golf and said at least one recreational facility is a golf course facility.

10. The method of claim 1 including the further step of communicating said booked reservation to said facility connected with said selection option.

11. The method of claim 1 including the further step of communicating said booked reservation to said facility connected with said selection option.

12. The method of claim 1 including, after step d), the step of creating an event reply page responsive to said selection, said event reply page having available slots, and wherein step g) includes sending an electronic mail message to said at least one other participant providing a link to the event reply page.

13. The method of claim 12 wherein said event reply page includes at most three available slots.

14. The method of claim 12 including the further step of receiving one or more reply confirmations from said at least one other participant using a client application.

15. A computer system for arranging a recreational outing for a plurality of participants, comprising:

a network to which a first one of said participants and at least one other participant have access and across which said provider and said participants can communicate information using respective client systems; and a server application operable to communicate information across the network, said server application operable to:

provide simultaneous access to said participants to a database of information including reservation information related to a plurality of recreational facilities, said reservation information including at least one selection option, said option including a time and a date for an activity from at least one recreational facility, and a number of openings available for one or more additional individuals to join said activity;

receive a non-facility specific request pertaining to a plurality of facilities for at least one selection option;

retrieve and transmit, based on said received request, at least one selection option pertaining to at least one available reservation;

receive a selection from said first participant using a client computer of a selection option; and receive indication information from said first participant using a client computer, said indication information including information necessary to notify a number of individuals of said selection, said number of individuals being greater than said number of available openings.

16. The system of claim 15 wherein said server is further operable to communicate said selection to said number of individuals.

17. A computer system for arranging a recreational outing for a plurality of participants, comprising:

means for providing simultaneous access to reservation information for a plurality of recreational facilities to a plurality of participants;

means for receiving a non-facility specific request pertaining to a plurality of facilities for at least one selection option;

means for retrieving and transmitting, based on said received request, at least one selection option pertaining to at least one available reservation, said selection option including a number of individual openings available for said reservation;

means for a first participant to select a desired reservation from said reservation information for a plurality of recreational facilities; and means for notifying a number of individuals of said reservation, said number of individuals being greater than said number of openings available.

18. The computer system of claim 17 further including means for said first participant to book said selected reservation.

19. The system of claim 17 further including means for confirming acceptance by one or more of said number of individuals, wherein said means for confirming acceptance is limited to receiving at most three acceptances.

20. A method of arranging a recreational outing for participants using a computer, comprising the steps of:

a) providing a database including reservation information for a plurality of recreational facilities, said database further including selection information, said selection information including a time and a date for an activity at least one of said recreational facilities;

b) providing a plurality of said participants with simultaneous access to said reservation information and said selection information;

c) upon receiving a request for said selection information from a first one of said participants at a client computer, retrieving and transmitting to said first participant selection information pertaining to at least one available reservation, said selection information including a number of openings available for one or more additional individuals to join said reservation; and d) receiving a selection from said first participant from said selection information in c); and e) receiving indication information from said first participant including information necessary to notify a number of individuals of said selection, said number of individuals being greater than said number of available openings.

21. The method of claim 20 including the further steps of:

(f) communicating said selection to said number of individuals.

\* \* \* \* \*